Aug. 3, 1965 R. J. EULBERG 3,198,889

FLYING HEAD MOUNT

Filed Aug. 9, 1960

INVENTOR

R. J. EULBERG

BY Cushman, Darby & Cushman

ATTORNEYS

United States Patent Office 3,198,889
Patented Aug. 3, 1965

3,198,889

FLYING HEAD MOUNT

Robert J. Eulberg, Hudson, Wis., assignor to Sperry Rand Corporation, New York, N.Y., a corporation of Delaware Filed Aug. 9, 1960, Ser. No. 48,439
10 Claims. (Cl. 179—100.2)

This invention relates to positioning mechanisms, and more specifically to an improved mechanism for mounting and positioning various members in a predetermined spaced relationship with each other against a variable force tending to change such relationship. Although capable of varied utilization, the mechanism of this invention is especially adapted for use in recording systems, such as in conjunction with the transducer portion of the data storage system of an electronic computer, and for that reason is so described and illustrated hereinafter.

Present day large scale electronic computers require the storage of an extensive amount of information in the form of digital data. A widely used method of achieving this storage capacity is through the use of a magnetizable recording surface, such as the peripheral surface of a cylindrical drum, or the flat surface of a tape or disc, upon which each bit of information or data occupies a small portion of the area thereof. Since the stored information must be readily accessible when required, the surface on which the data is stored is rotated or moved at high speeds. As a selected area passes a predetermined location, information is read therefrom or stored therein by a transducer member in proximity thereto which is provided with signal means through which information or data is transmitted. The transducer, generally referred to in the art as a read-write head, should, for optimum performance, be located and maintained in a predetermined position relative to but usually spaced from the moving recording surface.

The spacing between the head and storage members may be maintained in various ways. One method currently utilized in the art and illustrated herein is to provide the head with a bearing face or surface directly opposing the approximate moving recording surface which, due to the movement, carries with it a boundary layer of the fluid, usually air, in which it is immersed. This layer constitutes a fluid cushion between the bearing and recording surfaces which will exert a force thereon inversely related to the clearance distance therebetween, tending to keep the head and storage members separated. A detailed analysis of sliding bearing theory may be found in an article by M. Muskat, F. Morgan, and M. W. Meres entitled "The Lubrication of Plane Sliders of Finite Width" published in the "Journal of Applied Physics" of March 1940. Briefly, it will be realized that for a given set of conditions, e.g., fixed recording surface speed, fluid viscosity, bearing surface area-to-head mass ratio, etc., a constant separating force will be exerted upon the bearing and recording surfaces by the fluid cushion for any predetermined clearance distance therebetween. By fixing either the head or storage member against movement away from the other member, and by applying a constant force to the other member which is in opposition to the force exerted by the fluid cushion, a fixed clearance distance will be maintained between the two members.

Maintenance of a constant fluid cushion force upon the recording head, however, is hindered by the presence of irregularities and eccentricities in the recording surface. These irregularities and eccentricities will cause an increase or a decrease of the fluid cushion force exerted upon the head, depending upon whether they take the form of depressions or protrusions. By maintaining a dynamic balance of forces as exerted upon the head member as the recording member rotates, the spacing between the head and recording surface will be maintained substantially constant regardless of the surface irregularities and eccentricities.

The air cushion force may vary in at least two directions due to irregularities in and the eccentricity of the recording surface; viz. in a direction vertical to the recording surface or the direction of rotation thereof, and in a direction to cause transducer rotation about an axis parallel to the recording surface rotation direction, e.g., for a cylindrical surface the air cushion force may vary along the axis of the cylinder in a direction vertical to the cylindrical surface. Thus in order to maintain the above described dynamic balance of forces regardless of recording surface irregularities and eccentricities, the transducer must be free to move in response to the air cushion force variations above mentioned.

In systems employing multitrack recording surfaces it is also important that the transducer element for each track be positioned and maintained in alignment with its associated recording track.

The present invention provides an inexpensive, easily manufactured improved positioning arrangement whereby each transducer member is maintained in alignment with its associated recording track while at the same time allowing the same movement vertical to the recording surface rotation direction and movement about an axis parallel to the recording surface rotation direction in response to air cushion force variations so that a substantially constant predetermined spaced relationship is maintained between the transducer member and the recording surface regardless of irregularities and eccentricities thereof.

It is therefore a primary object of the present invention to provide an improved arrangement for positioning and maintaining various objects in a predetermined spaced relationship against a variable force tending to displace same from such relationship.

It is another object of this invention to provide an improved positioning arrangement containing resilient means for resisting transducer member movement transverse to the recording surface rotation direction, while allowing the same movement vertical to the recording surface rotation direction and movement thereof about an axis parallel to the recording surface rotation direction.

It is a still further object of the present invention to provide an improved positioning arrangement for a transducer member relative to a recording surface whereby alignment adjustments therebetween may be accomplished to achieve better magnetic coupling between the transducer members and their associated recording tracks.

Other objects and advantages of this invention will become obvious to those having ordinary skill in the art by reference to the following detailed description of exemplary embodiments of the apparatus and the appended claims. The various features of the exemplary embodiments may be best understood with reference to the following drawings, wherein:

Figures 1, 1A, 3, 4:
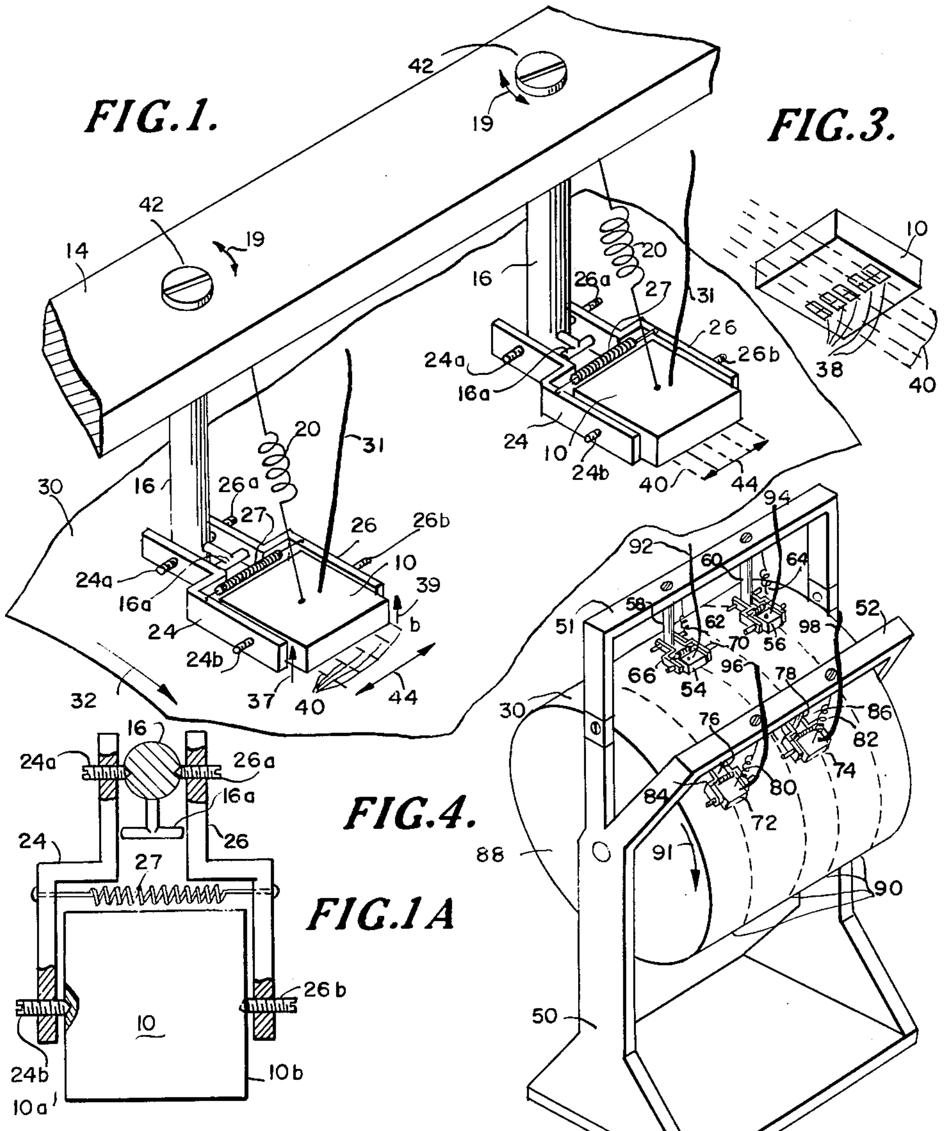
FIGURE 1 is a perspective view of exemplary mounting apparatus for a plurality of transducer members.
FIGURE 1A is a top plan view partly in section showing the mounting of transducer members upon a support member.
FIGURE 3 is an orthogonal view of a plurality of transducer elements mounted in a single transducer member.
FIGURE 4 is a perspective view of the mounting apparatus as employed in a drum storage system.

Referring to FIGURE 1, transducer members 10 are respectively attached to fixed mounting bar 14 via support members 16, springs 20 and holding members 24 and 26. Recording surface 30 is adjacent the transducer members 10 and rotates in the direction shown by arrow 32. It is understood that although the recording surface is shown cylindrical in the preferred embodiment, it may also be flat or disk shaped. Electrical conductors 31 connect the transducer members 10 to appropriate electronic circuitry associated therewith.

Holding members 24 and 26 are respectively point-pivoted to support members 16 by pointed screws 24*a* and 26*a* which seat in detents in the support member 16. This is best shown in FIGURE 1A. At the transducer member 10, the holding members 24 and 26 are point-pivoted to the member 10 by pointed screws 24*b* and 26*b* which seat in detents in the sides of member 10, best shown in FIGURE 1A. A tension spring 27 may be employed to retain the members 24 and 26 in place. Support member 16 may have an extended portion 16*a* with rounded, polished edges, for engaging the members 24 and 26 as necessary to prevent same from cocking off at an angle, in the manner that a parallelogram with corners at the points of screws 24*a*, *b* and 26*a*, *b* might tend to collapse. Another way to prevent such cocking action would be to use a shaft through support 16 and members 24 and 26 instead of the point-pivots, which would restrict rotation of holding members 24 and 26 to be within a single plane rather than universal.

Figure 2:
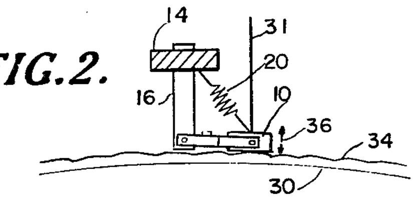
FIGURE 2 is a side view of the mounting apparatus for one transducer member.

Referring to FIGURE 2, there is shown a side view of the positioning arrangement for one transducer member. Although the positioning arrangement for one transducer member is illustrated therein, it is understood that all transducer positioning arrangements are substantially identical and that the following description is applicable to all such arrangements. Support member 16 is mounted in a snug fit to fixed mounting bar 14 through a hole in the bar and after placed therein, can be manually rotated about its own axis. The reason for the rotation will hereinafter become clear. Spring 20 is connected in compression between transducer element 10 and fixed mounting bar 14 and thereby provides the principal amount of force on the transducer member tending to move it toward the surface. The amount of force exercised by the spring will be adjusted to take into account the gravitation force acting upon particular transducers. When support member 16 is properly adjusted in the vertical direction to or away from recording surface 30, and when the compression of spring 20 is properly adjusted, transducer member 10 is placed proximate to the recording surface 30. As the recording surface rotates in the direction of arrow 32, it carries with it air cushion 34 which exerts a force on the bearing surface 11 of transducer element 10. The forces acting on the head in the direction vertical to the recording surface are those of gravity, spring 20 and air cushion 34. Since holding members 24 and 26 are pivoted relative to the support 16, transducer member 10 is free to move in the directions of arrow 36 in response to any air cushion force variation, e.g., due to recording surface irregularities, to maintain a dynamic balance of forces in the vertical direction and thus maintain the predetermined spaced relationship between the recording surface and the transducer member in the vertical direction.

The air cushion force also may vary along the recording surface in a direction vertical thereto as before described. For example, in FIGURE 1 the air cushion force may be greater along edge 10*a* of transducer 10 in the direction of arrow 37 than along edge 10*b* thereof in the direction of arrow 39. In order to allow the transducer member to adjust in response thereto, it must have freedom to rotate about an axis parallel to the direction of recording surface rotation. Since the holding members 24 or 26 are point-pivoted to the transducer member 10, the latter is free to respond differentially to variations of the air cushion force at edges 10*a* and 10*b*.

Thus, there is in effect an opportunity to rotate as just stated.

As shown in FIGURE 3, each transducing member may contain a plurality of transducing elements 38. Although it is clear that this invention also applies to single element transducing members, plural element transducer members are desirable especially when using a multi-track recording surface. These tracks are shown in FIGURES 1 and 3 by dashed lines 40. Each is of finite width transverse to the direction of motion of the surface along the surface, and runs parallel to the direction of motion to store information onto the surface or read information therefrom. In general, there is one transducing element associated with each track. As before described, support members 16 are each mounted so as to be capable of manual rotation about the longitudinal axis thereof. The rotational directions are shown by arrows 19 in FIGURE 1. Fine magnetic coupling between the transducing elements and the multiple tracks is accomplished by rotation of support members 16 due to axial screw driver adjustments of slotted heads 42. These axial adjustments move transducer members 10 and 12 in the directions of arrows 44 thereby providing maximum track-to-transducer-member coupling.

Referring again to FIGURE 1, the tendency of the transducer elements and recording tracks to become unaligned during the course of operation thereof, due to transducer movement transverse to the recording surface rotation direction, is overcome by the particular physical configuration of holding members 24 and their mounting to the support members as aforesaid, any significant lateral movement independent of twisting of member 16 being precluded by portion 16*a* thereof.

FIGURE 4 shows the aforedescribed mounting apparatus as used in a magnetic drum system. Base 50 carries mounting bars 51 and 52. Transducer members 54 and 56 are respectively connected to mounting bar 51 via support members 58 and 60, springs 62 and 64, and small mass, holding members 66 and 70. Transducer members 72 and 74 are respectively connected to mounting bar 52 via columnar members 76 and 78, springs 80 and 82, and holding members 84 and 86. Each of the transducer members and the associated mounting apparatus is as described in connection with FIGURES 1, 2 and 3. Drum rotor 88 carries record track sets 90 on the surface thereof, and rotates in the direction of arrow 91. Leads 92, 94, 96 and 98 respectively connect transducer members 54, 56, 72, 74 with their associated electronic circuitry.

Thus, it is apparent that there is provided by this invention an improved mounting and positioning arrangement in which the various objects and advantages herein set forth are successfully achieved.

Modifications of this invention not described herein will become apparent to those of ordinary skill in the art after reading this disclosure. Therefore, it is intended that the matter contained in the foregoing description and accompanying drawings be intepreted as illustrative and not limitative, the scope of the invention being defined in the appended claims.

What is claimed is:

1. Aparatus for mounting a transducer device in spaced relationship from a magnetizable recording surface wherein the device and surface have relative motion in one direction comprising: a support means; a holding means mounting the transducer device, the holding means comprising two independent side-by-side members pivotally connected at one of their ends to the support member and at their other ends to the transducer device, the device being thereby spaced from the support means.

2. Apparatus as in claim 1 and further including a retaining member rotatably supporting the support means for permitting selective rotation of the holding means about an axis perpendicular to the one direction such that rotation of the support means is effective to move the transducer device transversely with respect to the one direction.

3. Apparatus as in claim 2 and further including a resilient member connected between the retaining member and the transducer device for urging the tranducer device toward the record surface.

4. Apparatus for mounting a transducer device in spaced relationship from a magnetizable recording surface wherein the device and surface have relative motion in one direction comprising: a rotatable support member; a holding means mounting the transducer device, the holding means comprising two independent side-by-side members pivotably connected at one of their ends to the support member and pivotably connected at their other ends to the transducer device; a retaining member supporting the rotatable support member such that rotation of the support member causes the holding means to rotate about an axis perpendicular to one direction to move the transducer device transversely with respect to the one direction; and a resilient member disposed between the retaining member and the transducer device for urging the device toward the record surface.

5. Apparatus for mounting a transducer device in spaced relationship from a magnetizable recording surface wherein the device and surface have relative motion in one direction comprising: a support means; a holding means mounting the transducer device, the holding means comprising two independent side-by-side members pivotally connected at one of their ends to the support means and at their other ends to the transducer device, the device being thereby spaced from the support means; and resilient means interconnecting the side-by-side members for urging the side-by-side members toward one another.

6. Apparatus for mounting a transducer device in spaced relationship from a magnetizable recording surface wherein the device and surface have relative motion in one direction comprising: a support means; a holding means mounting the transducer device, the holding means comprising two independent side-by-side members pivotally connected at one of their ends to the support means and at their other ends to the transducer device, the device being thereby spaced from the support means; resilient means interconnecting the side-by-side members for urging the side-by-side members toward one another; and a T-shaped member connected to the support means and disposed between the side-by-side members for preventing the side-by-side members from cocking off at an angle.

7. Apparatus for maintaining a surface of a first member adjacent to but out of contact with a surface of a second member by action of a fluid boundary layer therebetween while the surfaces are moving in a given direction relative to one another comprising:

(a) a support means having a holding means pivotally mounting the first member, the holding means comprising two independent side-by-side members point-pivoted at one of their ends to said support means and at their other ends to said first member, the holding means being constructed to permit separating movement of the surface of the first member from the surface of the second member and to permit rotation of the surface of the first member about an axis parallel to the direction of relative movement of the surfaces but to resist transverse movement of the surfaces relative to the direction of relative movement;

(b) and an alignment means including a retaining member rotatably supporting the support means for permitting rotation of the holding means about an axis perpendicular to the path of movement of the surface of the second member, so that the first member can be aligned relative to the second member in a direction transverse to the direction of relative movement.

8. Apparatus as in claim 7 wherein there is a means urging the first member toward the second member for exerting a force on the first member to control the separating movement.

9. Data storage apparatus comprising:

(a) a movable storage member provided with a magnetizable recording surface having at least one record storage track;

(b) a transducer device having a bearing surface, the bearing surface being disposed in proximity to a portion of said recording surface, said device and said recording surface having relative motion in one direction;

(c) a fluid cushion between said surfaces and exerting a separating force thereon;

(d) means maintaining said transduced device with respect to said storage member, said maintaining means comprising;

(1) a support means having a pivot axis substantially normal to the magnetizable record surface and being selectively rotatable about the axis;

(2) a holding means mounting the transducer device, said holding means comprising two independent side-by-side members pivotally connected at one of their ends to the support means and at their other ends to the transducer device, the device being thereby spaced from the support means and such that rotation of the support means is effective to position the transducer device transversely with respect to the one direction for permitting fine magnetic coupling between said transducer device and said record storage track.

10. Apparatus as in claim 9 and further including a plurality of transducer devices spaced-apart in a direction transverse to the one direction, each of the devices further having one of the support means associated therewith for providing individual adjustments transverse to the one direction to cause the devices to track in a predetermined transversely spaced-apart relation along the one direction.

References Cited by the Examiner

UNITED STATES PATENTS

| | | | |
|---|---|---|---|
| 2,537,657 | 1/51 | D'Humy et al. | 340—174.1 |
| 2,913,536 | 11/59 | Fuller et al. | 179—100.2 |
| 2,928,709 | 3/60 | Baumeister | 179—100.2 |

FOREIGN PATENTS

| | | |
|---|---|---|
| 764,434 | 12/56 | Great Britain. |

IRVING L. SRAGOW, *Primary Examiner.*

NEWTON N. LOVEWELL, BERNARD KONICK, *Examiners.*